US011032386B2

(12) United States Patent
Swildens et al.

(10) Patent No.: US 11,032,386 B2
(45) Date of Patent: Jun. 8, 2021

(54) MATRIX DATA SYSTEM FOR COMPUTATION OF EXACT AND PROXIMATE SOLUTIONS

(71) Applicant: Nimbella Corp., Santa Clara, CA (US)

(72) Inventors: Eric Sven-Johan Swildens, Los Altos Hills, CA (US); Anshu Agarwal, San Jose, CA (US)

(73) Assignee: Nimbella Corp., Santa Clara, CA (US)

( * ) Notice: Subject to any disclaimer, the term of this patent is extended or adjusted under 35 U.S.C. 154(b) by 0 days.

(21) Appl. No.: 16/505,658

(22) Filed: Jul. 8, 2019

(65) Prior Publication Data

US 2020/0014772 A1 Jan. 9, 2020

Related U.S. Application Data

(60) Provisional application No. 62/695,188, filed on Jul. 8, 2018.

(51) Int. Cl.
*H04L 29/08* (2006.01)
*H04L 29/06* (2006.01)

(52) U.S. Cl.
CPC .......... *H04L 67/2842* (2013.01); *H04L 67/10* (2013.01); *H04L 67/2804* (2013.01); *H04L 67/42* (2013.01)

(58) Field of Classification Search
CPC ............... H04L 67/27842; H04L 67/10; H04L 67/2804; H04L 67/42
See application file for complete search history.

(56) References Cited

U.S. PATENT DOCUMENTS

| | | | | |
|---|---|---|---|---|
| 2009/0030862 | A1* | 1/2009 | King | G06K 9/6277 706/45 |
| 2012/0030159 | A1* | 2/2012 | Pilaszy | G06F 16/951 706/46 |
| 2014/0279838 | A1* | 9/2014 | Tsirogiannis | G06F 16/22 707/603 |
| 2016/0098742 | A1* | 4/2016 | Minicucci | G06Q 30/0226 705/14.27 |
| 2018/0004836 | A1* | 1/2018 | Lewis | G06F 17/15 |
| 2019/0164096 | A1* | 5/2019 | Borje | G06N 5/02 |
| 2020/0014772 | A1* | 1/2020 | Swildens | G06F 16/2465 |

\* cited by examiner

*Primary Examiner* — Christopher B Robinson
(74) *Attorney, Agent, or Firm* — Wong & Rees LLP; Kirk D. Wong

(57) ABSTRACT

A matrix data system enabling efficient function computation on source vector data by an array of matrix data servers is disclosed. Descriptive vectors, that describe partial function solutions on underlying source vector data, are computed and stored by the array of matrix data servers and utilized to efficiently compute function solutions. An array of matrix data servers can operate as a single entity, with function computation distributed across the servers in the array. The system can cache computed descriptive vectors, only pulling source vector data as necessary. The system can produce solutions in matrix, tabular, vector or graphical form. In addition to computing solutions, the system can trigger processing on data events, such as when a function or value relating to source vector data changes or goes out of a bounded range. The system is also capable predicting future events based on historical data.

20 Claims, 8 Drawing Sheets

MATRIX DATA SYSTEM FOR COMPUTATION OF EXACT AND PROXIMATE SOLUTIONS

PRIORITY CLAIM

This application claims the benefit of U.S. Provisional Application No. 62/695,188, filed Jul. 8, 2018, the entire contents of which is hereby incorporated by reference for all purposes as if fully set forth herein, under 35 U.S.C. § 119(e).

TECHNOLOGY

The present invention relates generally to providing services for use by a customer, and in particular, to efficiently performing complex mathematical calculations in a distributed system.

BACKGROUND

Numerous techniques are available to analyze and transform large sets of numerical data with goals of enabling data visualization, discovery and prediction of potential future values. In addition, a variety of methods exist to process and trigger events, if and when a set of given conditions are met, when dealing with numerical data generated in real time. Real-time numerical data can be obtained from a multitude of sources including environmental sensors, transaction records, Internet online activity and mechanical processes, to name a few.

Numerical data collected may be stored in unstructured files but is more typically stored in one or more databases. The most common types of databases used to store data are SQL and NoSQL databases.

SQL databases commonly store data in row/column tables with sorted columnar indexes, allowing the quick lookup of rows of data by a column index value. Columnar indexes are typically stored utilizing a binary tree data structure causing insert of a row of data into an SQL table to be an $O(\log n)$ speed operation. Similarly, lookup of a row by an indexed value is also typically an $O(\log n)$ speed operation.

NoSQL databases generally store data in non-tabular relations although that is not always the case as NoSQL databases come in a variety of types including: Key-value store, Document store, Graph and Wide Column Store, to name the most common. Many of these have indexes which are hashed keys, allowing insert and lookup of data values in $O(1)$ speed by a hash key index.

A limited number of mathematical functions are typically available as part of a database itself and the speed of those operations tends to differ between SQL and NoSQL databases. For example, with an index on a numerical column of data, finding the maximum of numerical values in that column is an $O(1)$ speed operation in a typical SQL database, as the ordering of the data by value is calculated during data update, insertion and deletion. In a NoSQL database, determining the maximum value of a given set of numerical data may be an $O(n)$ speed operation, as all items must normally be checked to find a maximum if no ordered index exists.

To find the average value in a numerical column of a SQL database, the values must be added up and the total divided by the number of values, typically an $O(n)$ speed operation.

Some SQL databases contain an aggregation method that aggregates an identified column into a grouping column to speed up this type of operation when aggregating by group. Multiple-level aggregations with multiple grouping columns, aggregated columns and/or multiple result columns can be supported with the method when implemented in a SQL database.

In a NoSQL database, the average function across a set of values is also typically an $O(n)$ speed operation.

Databases typically support a small set of aggregate functions that operate on sets of data and that output individual values and another set of mathematical functions that operate on individual values themselves. The most common aggregate functions include COUNT (find the cardinality of a set), MAX (find the maximum value in a set), MIN (find the minimum value in a set), AVG (find the average value in a set) and SUM (add up the values). An example of operations that may be performed on individual items include ABS( ) ROUND( ) LOG( ), SQRT( ) and SIN( ). Combinations of the two types can be used. For example, a query can be performed to find the MAX( ) value of the SIN( ) values of a given set of values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
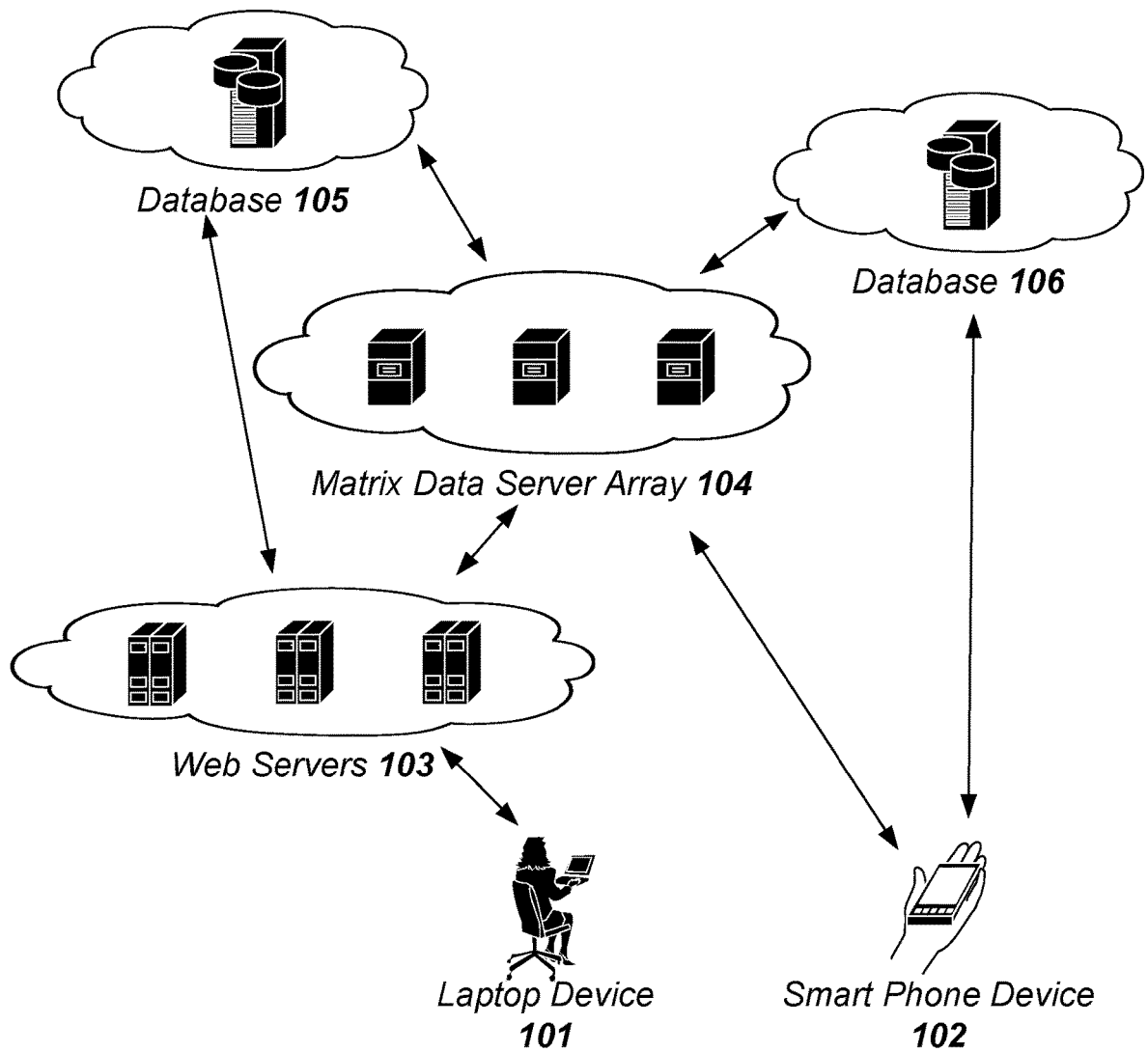
FIG. 1 illustrates a network diagram of a system containing representative matrix data servers, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
  1.0. General Overview
  2.0. Functional Overview
    2.1. Structural and Functional Description
  3.0. Implementation Mechanism—Hardware Overview
  4.0. Extensions and Alternatives 1.0 General Overview Many databases support stored procedures allowing more complex mathematical functions to be implemented by writing custom computer code that executes in the database itself. Stored procedures are not utilized to optimize algorithmic speed but to optimize data access speed, since code running inside a database is closer, in terms of latency and bandwidth, to the data it needs to operate on.

More typically, mathematical functions are implemented to run outside a database by writing a computer program that loads data from the database and computes a function based on the data obtained. To reduce the time it takes to perform a given mathematical function, computer code can be run on a number of machines in parallel, either in a cluster (local network) or grid (distributed network). A MapReduce framework may be utilized to distribute computation across multiple machines and merge results.

When visualizing time-based data, it is common to write code that applies a mathematical function to data values along a time dimension and then graph the result. When data is visually presented in a graph in a user-interface, the interface typically allows a user to select different time ranges to view.

To allow quick graph generation by the code, mathematical data transformation and calculation can be performed as collected data is received and either in parallel with or before it is stashed in a SQL or NoSQL database. Alternatively, data transformation and calculation could be performed at regular intervals.

As an example, a data transformation system may compute data that allows the quick generation of a day graph for a set of values, once a day. The resulting computed data may be stashed in a database for quick retrieval later. Data for week, month and year graphs can be similarly calculated at regular intervals.

Alternatively, functions can be computed for interval time ranges, such as 10-minute intervals, and a graphing system can simply draw a week from the computed 10-minute interval data. These various methods of pre-computing functions along a time dimension for quick graph generation are commonly used for graphs relating to usage or utilization of a resource over time.

To aid the analysis and visualization of pure matrix-based data, specialized systems exist that enable the computation of solutions to linear algebra transformations and other algebraic problems on large data sets. The systems distribute matrix data across a set of computation servers and can utilize sparse matrices to handle matrix data with large empty areas. These are typically not used to operate on sets of data that are constantly changing.

Many SQL and NoSQL databases support database triggers that can cause additional processes to be executed according to business rules as data is added, deleted or modified to a database. An example of this would be a trigger that causes a computer program to run if a customer balance in the database goes over a computed risk value.

As data streams continue to grow in both size and speed and as data continues to be spread among more disparate databases, a system that would enable mathematical functions to be calculated more quickly on these data streams would be advantageous for data analysis and visualization. It would further be advantageous to provide a system where computation was automatically distributed among many machines for system scalability and in a way that allowed it to easily inter-operate with existing databases.

In an embodiment, a matrix data system provides efficient computation of functions on large, distributed, rapidly updated data sets. The matrix data system may be implemented on a set of matrix data servers locally or may be deployed as a cloud-based Internet service.

The system operates by changing the way mathematical functions are normally computed on data sets by breaking a given mathematical function into intermediate mathematical calculations and then caching or storing the results of the intermediate calculations as solutions are computed. This operates in contrast to other solutions, where final answers of computations may be stored and used later, if a solution for the same function is requested. By caching or storing the intermediate results of function calculations, those intermediate solutions have the possibility to be re-utilized as immediate partial function solutions in future calculations.

Intermediate solutions are kept in the form of "descriptive vectors" which are partial function solutions on an underlying set of vector data. A descriptive vector can be associated with a range of scalars in a source vector from a source such as a database or can describe partial or complete solutions to functions associated with other descriptive vectors. Descriptive vectors covering disjoint ranges of data can be combined to calculate a solution to a function over a union of data ranges.

2.0 Functional Overview

I. Descriptive Vector Structure

Descriptive vectors are kept in a tree hierarchy where the deepest leaves in the tree (lowest level descriptive vectors) are associated with source vector data and higher levels are associated with sets of lower level descriptive vectors. The highest level descriptive vector is the root of the tree and describes a partial function solution for the largest range of source data.

To calculate a solution to a function, a tree of descriptive vectors associated with the function's partial solutions is traversed to identify the highest level descriptive vectors completely internal to the range of data the function is to be computed against. A calculation is then performed on this set of descriptive vectors, and potentially data directly from source vectors for data that lies just outside the range covered by the descriptive vectors, to produce a solution.

In the process of combining descriptive vectors to determine a final solution or in the process of creating descriptive vectors for ranges of source data, when new descriptive vectors are created during processing, they are stored or cached to potentially be used in future calculations.

A given range of source data can have multiple descriptive vectors associated with it. Descriptive vectors are specific to the mathematical functions they are associated with. To generate function solutions for arbitrary ranges of source vector data, a tree of descriptive vectors is traversed to identify the descriptive vectors that cover the required ranges of data. If no descriptive vector exists for a range of a source vector, the scalar values of the source vector could be used for the computation and a descriptive vector can be created for them, as needed.

Some embodiments may provide descriptive vectors that allow the prediction of future values from a set of numerical source data. These types of descriptive vectors may describe partial or multiple curves that closely or generally fit underlying source data or other descriptive vectors. Curve data may be analyzed to predict future values based on combined partial or full historical curves.

A given range of source vector data may have multiple types of descriptive vectors and descriptive vector trees associated with it.

The objective of utilizing a tree of descriptive vectors is to turn mathematical operations that are typical O(n) speed operations over a data set into O(log n) speed operations, on average, after a worst-case initial O(n) speed calculation is performed. Additionally, the use of descriptive vectors gives the possibility of having a O(1) speed solution in the best case scenario for many functions that typically have O(n) computation speed, if a descriptive vector is immediately available that solves a given function on its own.

II. Exact, Proximate and Sampled Solutions

Descriptive vectors can be utilized to compute either exact or proximate solutions to mathematical functions on a set of source data. A given type of descriptive vector may describe the answer to a partial function solution only approximately and with a given margin of error and/or standard error. These proximate solution descriptive vectors can be combined to give an answer bounded by a margin of error and/or standard error. With these types of descriptive vectors, whether an answer is proximate or exact may depend on the values in the data set themselves.

Some embodiments of the matrix data system can allow a quick estimate to be computed for a solution to mathematical problem over a set of source data by computing the function over a sample of source data instead of a full range of source data. Sampling may be random or systematic in nature. Using statistical methods, a confidence interval can be returned for a function computed on sampled data. This allows a very rough answer to be returned quickly when an exact or more proximate answer is not necessary and is useful for operations such as showing rough approximations of graph data while interactively scrolling through a data graph.

III. Data Management

In some embodiments, a matrix data system will operate as a cache and not store source vector data itself. Instead, it is configured to pull source data from one or more databases as needed. When operating as a cache in this manner, the system manages the descriptive vectors associated with the source data and not the source data itself. Source data may be pulled from local or cloud-based service databases.

In some embodiments, the matrix data system can be fed source data and will manage the storage of the source data. In this case, it will either store the data on a local file system or in one or more local or cloud-based databases.

Some embodiments may manage the storage of descriptive vectors by storing them in matrix server local memory and/or on matrix server local file systems. Some embodiments may distribute descriptive vectors across an array of matrix servers where a given subset of matrix servers is authoritative for and stores or caches a given subset of all descriptive vectors.

Embodiments may utilize consistent hashing to spread descriptive vectors across the machines in an array.

In the case where descriptive vectors are stored across an array of matrix servers, the servers may be broken up into groups associated with specific data sets. In the case where descriptive vectors are cached, when a given storage mechanism reaches capacity, the oldest accessed descriptive vectors may be removed to make room for newly generated descriptive vectors.

Some embodiments may store or cache descriptive vectors in an external or cloud-based database.

IV. Computing Solutions to Functions

Some embodiments may compute solutions to functions on source data by first determining the descriptive vectors and any underlying source data needed to compute a result.

Authoritative matrix data servers for the set of descriptive vectors and underlying source data ranges are then contacted, in parallel, to request a complete set of the highest level of descriptive vectors that cover the inside of the data range of the given source data along with any outlying source data needed. An authoritative server contacted for a given descriptive vector may need to compute the vector from lower level vectors or from source data. When servicing a request for a descriptive vector, any new descriptive vectors computed in determining the response to a request are stored or cached for potential future use.

After receiving the descriptive vectors and any source data from the authoritative matrix data servers, a solution is computed utilizing the returned vector data, along with any source data required, and a response is generated that includes the solution.

Some embodiments allow any of the matrix data servers in an array to be contacted to compute a solution.

V. Handling Requests and Returning Results

Some embodiments may present the matrix data system as a hosted, cloud-based Internet service. A RESTful API can be made available for clients to make requests to and get responses from a matrix data system. An API key can be utilized to restrict access to the service.

Individual user groups or data sets can be associated with individual or grouped hostnames. Load balancing of a set of matrix data servers on a local (virtual IP or MAC based) and/or global level can be utilized to ensure high availability for the matrix data system.

Some embodiments may provide multiple hostnames associated with disjoint sets of matrix data servers, allowing client-side load balancing to be utilized where if a client making a request to a first hostname encounters an error, an attempt is made on a second hostname.

Some hosted cloud-based embodiments can have a pay by usage model.

Solutions to functions may be returned in tabular form, vector form or in graphical form. Some embodiments may return solutions in JSON, XML, CSV or in a custom ASCII or binary format.

When returning graph results, some embodiments may support a wide variety of graph types including line, bar chart, histogram, scatter plot, candlestick, area and 3d area to name a few.

VI. Data Events

In some embodiments, the matrix system may be configured to check at regular intervals if a data event should be triggered. Matrix servers can be configured such that a notification is sent or a process is executed when a source value goes inside or outside of a given range or when computed solutions' values go inside or outside of a given range. In some embodiments, the matrix system can be configured to check to see if a data event should be triggered by an on demand request to the system. In some embodiments, when a data event is triggered, the matrix system may make an external network request to notify an external server of the data event.

The advantages, aspects and alternatives of this invention will become apparent to those of ordinary skill in the art by reading the following detailed description, with reference, where appropriate, to the accompanying figures.

2.1 Structural and Functional Description

In an embodiment a matrix data system is comprised of an array of matrix data servers in a computer network. The system responds to requests to solve mathematical functions on data and can dispatch events when data events occur.

A matrix data server may be physically represented as dedicated computer hardware devices with a CPU, memory and, optionally, storage or it may be represented as a virtual server. A virtual server is one where a single hardware computer device appears as many, independent servers. In either case, the server may be present in a local environment or a cloud environment.

FIG. 1 shows one possible embodiment of a representative matrix data server array present in a computer network. In the figure the matrix data server array 104 is present in a cloud environment in the Internet. Some representative cloud environments are Amazon AWS, Google Cloud or Microsoft Azure. In this case, the individual server presented in the array would be a virtual server, hosted by a physical server in the respective cloud environment.

In this embodiment, a matrix data system can be used to present information in graphical form in a web page. To enable this, a user 101 using a laptop computer device may connect to a web server 103 to be delivered a web page that contains a graphical, visual representation of data created by the matrix data server array 104. To present a visual representation of data, a web server 103 can deliver a HTML page to user's laptop 101 with a graph component contained inside. The graph component itself could be in a binary image format such as PNG or JPG or the graph could be presented as interactive element such as a HTML Canvas drawing. To obtain the graph component to deliver, a web server 103 could either contact the matrix array 104 and request a graphical image or it could request data from matrix array 104, draw the graphical representation itself using computer code and return that image to device 101.

When asked for a graph of data or data for a graph from a web server 103, the matrix array 104 would contact database 105 and database 106 to request any source data it needed to create a response to web server 103.

Applications written for a handheld device such as a smart phone 102 can contact the matrix array 104 to obtain graphs to display or to obtain data to present visually to a user. An example application might be one written for Apple's iOS or Google's Android operating systems. An application running on smart phone 102 can contact other databases, such as database 106 directly, or other servers as part its operation. In the case the smart phone 102 requests a graph or data from matrix array 104, the system would calculate a result to return in the same manner of handling a request from a web server 103.

Requests from web server 103 or device 102 to matrix array 104 may be in the format of RESTful JSON API (Representational State Transfer JavaScript Object Notation Application Programming Interface) calls over the HTTP protocol (HyperText Transfer Protocol) utilizing SSL/TLS (Secure Sockets Layer/Transport Layer Security) to enable secure communications between the two parties.

A matrix server array 104 is comprised of a number of matrix data servers operating as a single entity. DNS (Domain Name Service) hostnames can be used to direct requests to a given set of matrix arrays or individual servers in a matrix array. DNS hostnames can be associated with one or more IP addresses representing either entire arrays or individual servers in an array.

After resolving a hostname to a set of IP addresses, a client device 102 or server 103 chooses one of the IP addresses in the set to contact. If the server or service associated with that IP address is not able to be contacted or is slow, the request can be re-sent to another IP address in the set. This mechanism allows load to be balanced across the servers or arrays and helps ensure high availability of the matrix data system.

DNS hostnames representing a matrix data system may be CNAMEd (redirected) to other hostnames, allowing external DNS load balancing services to be utilized and changed as needed.

A group of matrix data servers can operate utilizing a shared, virtual IP address with a local load balancing mechanism that tests and monitors individual servers and adds or removes them from the virtual IP address group based on their load and availability.

If a matrix server is shared or public, the server and requester can use a shared private key associated with client identifiers and specific data sets to prevent one client from accessing another client's data. The key can be used as an API key to authenticate API requests to the system. Alternatively, public/private key encryption can be used to authenticate the client (requester) and/or server.

When a matrix server is requesting data from a source such as a database, authentication keys or passwords may be required to access the source data. The configuration for the server can contain these keys and they can be stored in encrypted form.

Figure 2:
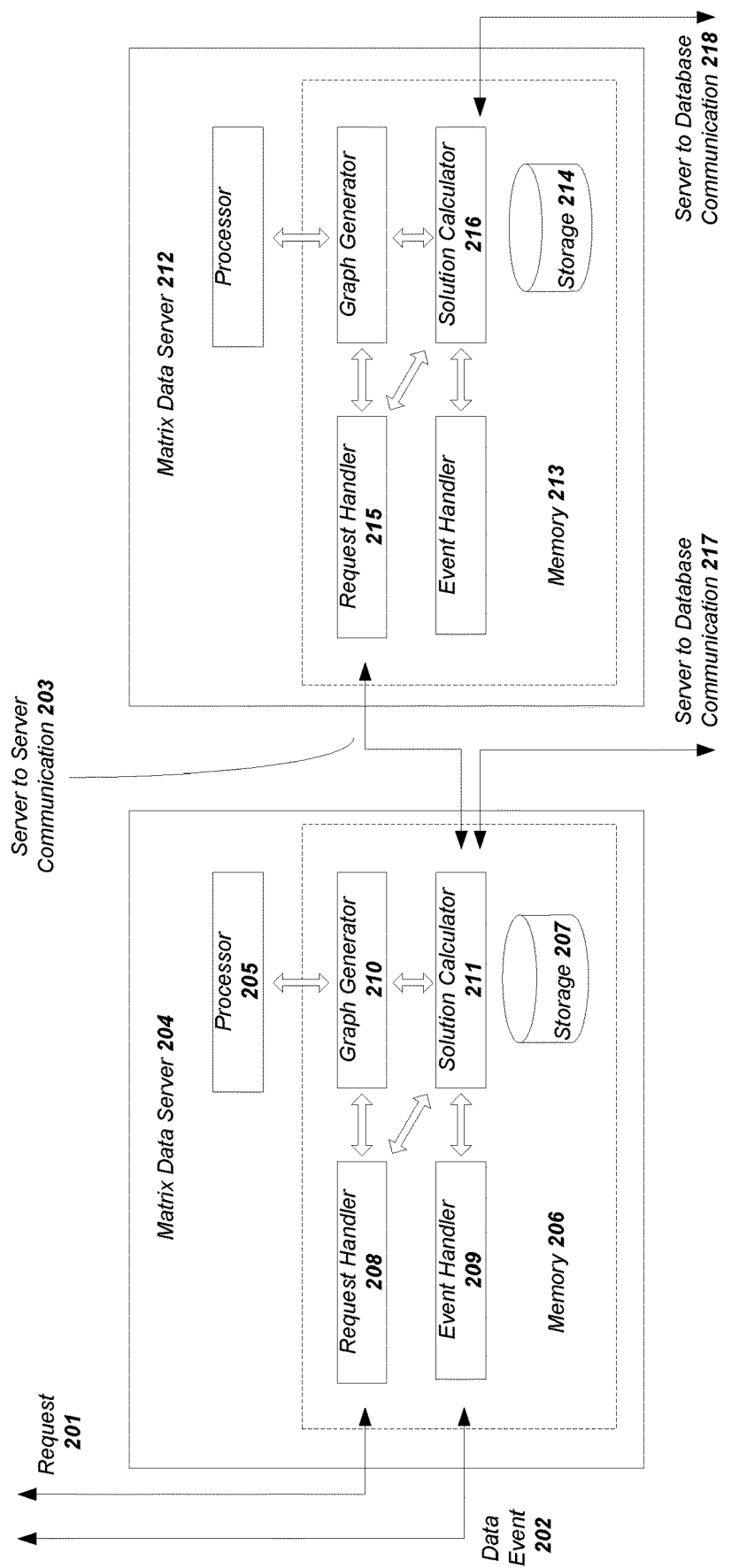
FIG. 2 illustrates a functional block diagram of the internal architecture of two matrix data servers, according to an embodiment of the invention.

FIG. 2 shows the internal architecture of an individual matrix server in a matrix array 104. An individual matrix server can be a hardware computing device containing a computer processor 205, memory 206 and storage 207 or it can be a virtual server where the processor, physical memory and storage of a hardware computing device is shared among a number of virtual servers.

A request 201 made to a matrix data system can be directed to an individual matrix data server either by a global (DNS) or local (virtual IP address or proxy) load balancer that directs it at the IP address of an individual matrix data server or a requester can contact an individual matrix data server directly by its identifying IP address.

FIG. 2 shows a request handler 208 in matrix data server 204 receiving an external request 201. The external request may be a request for computed data or for a graphical representation of computed data.

In the case the request is for a graphical representation of computed data, the request handler 208 contacts a graph generator component 210 to calculate a graph to respond to request 201. The graph generator 210, in turn, contacts solution calculator 211 to obtain the computed data necessary to draw the graph, draws the graph in the requested format and returns it to the request handler 208 which responds to the request 201 with the generated graph.

In the case the request is for computed data, the request handler 208 will contact solution calculator 211 to compute the data necessary and respond to the request 201 with that computed data.

The solution calculator 211 is the heart of the matrix system and is responsible for performing mathematical computations on source data (e.g., numerical source data). A matrix server may operate in one of two modes with respect to source data, it may either be fed and manage the storage of source data or it may contact external databases to obtain source data.

In the case where a matrix server is fed source data, it can either store the source data it receives on its local storage or it can pass the data to an external database so it may be externally stored. FIG. 2 shows a matrix data server operating in the alternative mode, where the server does not manage the source data and where it contacts an external database, as needed, to obtain source data.

In either case, when a matrix data server is part of a matrix data server array, it is only authoritative for a subset of the total source data.

When solution calculator 211 is asked to calculate a solution for a range of source data, it first determines which matrix servers in the array are authoritative for the various ranges of data in the source range. If the server itself is authoritative for the full range of source data required for the calculation, it can calculate the answer without contacting any other servers.

However, in the case where other servers are authoritative for ranges of the required source data, the solution calculator will make a request to those authoritative servers for data solutions for those portions of the source data set.

The mapping of matrix servers to the source data ranges they are authoritative for can be simple percentages of the full source data range. For example, if there are 5 matrix data servers in an array, each can be responsible for ⅕ of the total range of source data. Servers can be numbered so the first server would be responsible for the first ⅕ f the range, etc. The individual servers could monitor the number of servers in the array and if one failed, the other servers could determine they would then be responsible for ¼ of the source range. Similarly, if a server was added, each would determine they were responsible for ⅙ of the entire range.

In FIG. 2, when a request 201 is being processed by solution calculator 211 and it determines that matrix server 212 is authoritative for some range of the source data that a solution needs to be calculator for, it will make a request using server to server communication 203 to the request handler 215 of matrix server 212. Request handler 215 will contact the solution calculator 216 to calculate a solution for the given range of source data. That, in turn, will calculate a result using cache or stored descriptive vectors from memory 213 or storage 214 and will contact the source database using server to database communication 218 if needed. Descriptive vectors calculated by the solution calculator 216 during the computation of a solution are stored in memory 213 and storage 214.

If the solution calculator 211 in matrix server 204 is unable to contact matrix server 212, it can contact an alternative authoritative server for the same data. If the alternative server cannot be contacted, in the worst case, matrix server 204 itself can assume authority for that range of source data and perform the calculation, itself.

When computing a solution, solution calculator 211 obtains descriptive vectors stored in memory 206 and storage 207 and contacts databases containing source data using server to database communication 217 when necessary for the source data ranges matrix 204 is authoritative for. Solution calculator 211 uses that data plus any data it obtained from other servers to calculate a solution.

As it computes solutions, intermediate function results are stored as descriptive vectors in memory 206 and storage 207. The descriptive vectors are stored at different levels in a hierarchy for a given dimension of the source data. When memory 206 or storage 207 becomes full, the least recently accessed descriptive vectors can be deleted, allowing both to operate as a descriptive vector cache.

A matrix data server contains configuration files that allow it to determine the locations of source databases along with the information necessary to access them such as username, password, etc. In addition to containing information about source locations and about the set of matrix data servers in an array, the configuration files can contain hints about what types of requests will normally be performed. The system can use this information to opportunistically calculate solutions to functions at regular intervals to cache or store descriptive vectors related to newly added data. If the system is being fed data to be stored, the system can calculate descriptive vectors related to newly added data as the data is received.

Configuration files can also contain information about data events. A matrix data server may be configured to generate a network data event when specific function values on source data exceed a bounded range. Matrix servers in an array are authoritative for a subset of all events based on the configuration. Event configuration IDs can be mapped to matrix servers by number using a modulus operation. Multiple matrix servers may be assigned to check for the same event to ensure redundancy in case of the failure of a single server.

The event handler 209 in matrix data server 204 can be configured to look for and generate data events. If a server is not being fed source data, data events can be checked for at a configurable regular interval. If the matrix server is being fed source data, it can check for data events as source data is received. To check for a data event, event handler 209 contacts solution calculator 211 to calculate a function solution according to the configuration. The solution's result will then be checked against the bounds associated with the event from the configuration and if the bounds is exceeded by the result, event handler 209 can generate a network data event 202.

A data event can be any network request and the specific request is determined by the configuration. An example network data event request would be one where if the average of a source value over a given amount of time goes over a certain bound, then a request is made to another server that, in turn, modifies a web page to add an alert to the web page. Alternatively, a network data event may cause a text message to be sent to a mobile phone or it may cause an additional row to be added to a SQL database containing data relating to the event.

To generate solutions for mathematical functions quickly, solution calculator 211 utilizes descriptive vectors.

Figure 3A:
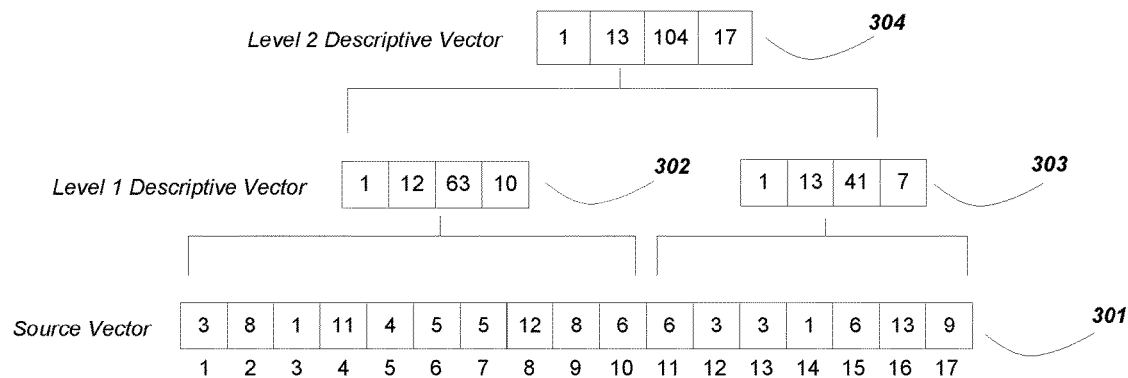
FIG. 3A illustrates the structure of one type of descriptive vector tree, according to an embodiment of the invention.

A descriptive vector is associated with a specific set of mathematical functions. FIG. 3A shows an example embodiment of one type of descriptive vector associated with functions MIN, MAX, SUM, COUNT and SUM. This descriptive vector contains the minimum value, maximum value, the element count and total sum of the vector set it describes. Descriptive vectors of this type are created for disjoint ranges of the source data vector and then combined to create higher level descriptive vectors that represented partial solutions to larger ranges of the source data as shown in the figure.

Descriptive vector 302 describes the underlying elements in the source vector 301 range from in a dimension that spans 1 to 10. The first scalar in the vector is 1, the minimum of the 10-element source set. The second value is 12, the maximum of the set. The third value is 63, the sum. The fourth value is 10, the cardinality of the underlying set.

Descriptive vector 303 describes the underlying range of source vector in the same way, for the range of values 11 through 17.

These two descriptive vectors are combined into a level 2 descriptive vector 304 that covers the combined range. To create a descriptive vector for the combined range, a simple math operation can be performed on the two level 1 descriptive vectors 302 and 303. The minimum value is the minimum value of both descriptive vectors, the maximum is the maximum of both, the total sum is the total sum of both and the element count is the sum of both element counts.

When a solution calculator is asked to calculate a function for a range of source data, it uses any previous calculated descriptive vectors associated with that function. For example, to sum elements 1 through 12, the sum in descriptive vector 302 would be added to the sum of elements 11 and 12. If descriptive vectors are available, utilizing them enables a sum operation in O(log n) algorithmic speed in the worst case and O(1) in the best case (in the case a sum is the full range, for example).

Descriptive vectors are stored in a binary tree. An indexing hash table is available that allows O(1) lookup by the source vector identifier, starting index dimension value and descriptive vector level.

Figure 3B:
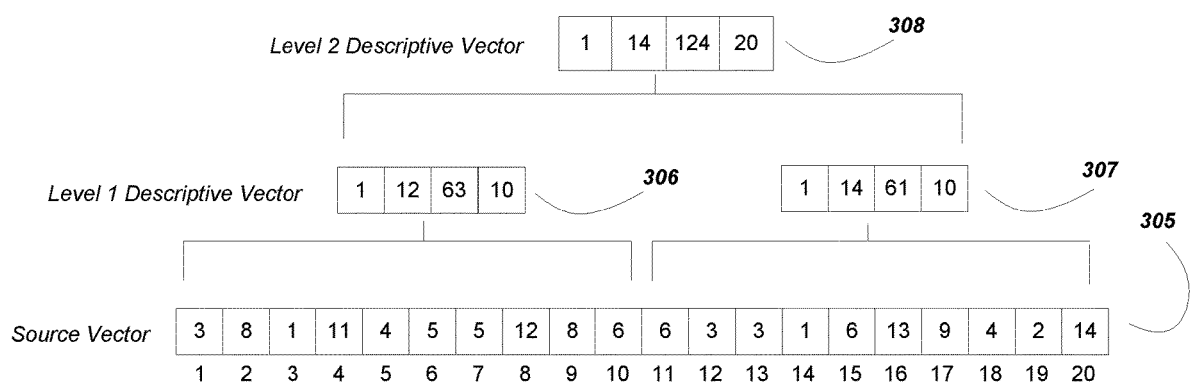
FIG. 3B illustrates the structure of one type of descriptive vector tree after values are added to the source vector and the corresponding descriptive vectors are updated, according to an embodiment of the invention.

FIG. 3B shows how the addition of values to the source vector affects the descriptive vectors calculated in FIG. 3A. FIG. 3B shows 3 additional values added to source vector 305. If a sum function is immediately requested on the entire range, the 18 through 20 elements have no descriptive vector associated with them so descriptive vectors 302 and 303 are used along with the source values for elements 18 to 20 to compute a result.

In computing the result, descriptive vector 303 is updated to include the newly added elements, resulting in descriptive vector 307. Additionally, descriptive vector 308 is updated to include updated values for the entire range of data as well.

The descriptive vectors resulting from a request to sum the elements is shown in FIG. 3B. Descriptive vector 306 is unchanged and describes the left set of values. Descriptive vectors 307 and 308 were updated during the calculation and descriptive the right set and total set, respectively.

According to this method, the algorithmic speed of sum functions on ranges of data that have descriptive vectors associated with them is O(log n). For ranges without descriptive vectors, the sum function is O(n). An O(n log n) speed operation is required to create the descriptive vectors of this type, for a given range.

Because the descriptive vector that was utilized in this example for the sum function also allows perfect computation of the minimum, maximum, average and count, all those functions can run in O(log n) speed if descriptive vectors are available for the source vector range involved by combining descriptive vectors and any source values lying just outside the descriptive vector, at the extremes of the subset range.

In the case where the source vector range is large and where descriptive vectors have not been calculated, the system can support a sampled function calculation. Instead of solving a function on all values in the entire source range requested, and calculating associated descriptive vectors in the process, a subset of descriptive vectors can be calculated for the given range and values calculated from that.

The result of the calculation will not be exact for the entire source range but it can give an idea of what the solution for the entire range could be. Sample ranges can be taken at regular intervals or at random intervals. When samples are taken, the associated descriptive vectors are calculated so if a function over the whole range is later calculated, those descriptive vectors can be used. This may be useful when calculating data associated with scrolling through a graph of data and where a perfect graph does not need to be displayed while actively scrolling.

Requests can be made to the matrix server with a value indicating a maximum response time. If the server can't calculate a full answer before the maximum time, it will return the best sampled function result it can compute during that time. This allows a quick response with a sample answer for interactive graphs and data visualization. An example would be a request for a graph with a maximum response time of 1/30 of a second. A sampled graph could be rendered quickly, allowing a user to manipulate the graph interactively to quickly find an interesting data region. When a region is found, the full, non-sampled calculation can be performed to create a non-sampled data graph.

A set of descriptive vectors of a given type for a range of data can be stored as a matrix with each vector containing pointers to child nodes and an associated hash table to allow quick indexing into the matrix. The matrix itself is spread across an array of machines. Which machines contain the portions of the full matrix is configurable. Recent and active portions of the matrix are stored in memory on a given matrix server and portions of the matrix that are not active can be stored on the storage device, typically a SSD drive or similar, in a matrix server. Descriptive vectors may also be stored in an external database. A M×N matrix can be stored as a row/column table in a SQL database allowing descriptive vectors of a given type to be stored in a single SQL table.

Descriptive vectors can be associated with functions that can calculate either exact or proximate results. Whether a function can produce an exact or proximate result on a given set of source data may depend on the function used, the descriptive vector and the data itself.

An example a descriptive vector that can calculation a solution with a proximate result is a descriptive vector associated with the median and percentile functions. This descriptive vector allows the calculation of a median value from a set but within a given margin of error. One possible descriptive vector for calculative exact or proximate medians and percentiles on a set of source data is shown in FIG. 4.

Figure 4:
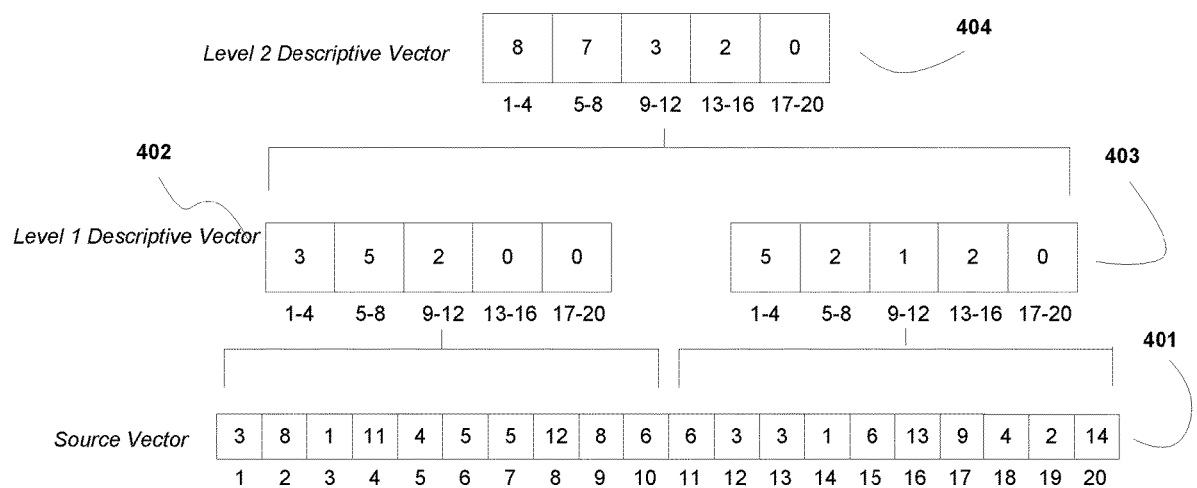
FIG. 4 illustrates the structure of one type of descriptive vector tree, according to an embodiment of the invention.

FIG. 4 shows a descriptive vector 402 that describes attributes of the first 10 elements in source vector 401. Descriptive vector 402 contains 5 elements. Each element shows the number of values in the source vector that fall into a range of values. The first value in vector 402 shows the number of values in the source vector range that are between 1 and 4, inclusive. The source vector range contains a 3, 1, 4 that falls into the range causing the value in the first element of 402 to be 3. Similarly, the other elements in vector 402 contain the number of elements in the source vector range that fall into the given ranges.

If a request was made for the median of the first 10 elements of source vector 401, descriptive vector 402 could be used to determine the answer was within the range 5 through 8 as the total number of elements in the set is 10 and the middle element in the set falls within the 5 through 8 element range in vector 402. The range 5 through 8 can also be described as 6.5 with a margin of error of 1.5.

A similar descriptive vector 403 can be created for the right half of source vector 401. And both vectors can be combined using addition to create a level 2 descriptive vector that covers the entire range of values in the source vector.

Using the level 2 vector 404 alone, the median for the full range is determined to also be 6.5+−1.5 as the middle element falls into the 5 through 8 range.

Longer descriptive vectors pf this type allow for more narrow ranges of values and more accurate answers at the expense of space used to store the vectors. These same descriptive vectors can also be used to determine percentile. From descriptive vector 404, the $10^{th}$ percentile of the overall range can be calculated as 2.5+−1.5 as the $10^{th}$ percentile falls into the first element in vector 404, the range 1 through 4.

In FIG. 4, the descriptive vectors hold ranges of equal spacing. However, an unequal spacing may be advantageous if it is known that only a median will be computed and if it is known the general area where the median will likely fall. The center ranges in the vector may be smaller and the ranges at the start and end of the vector wider. This has the possibility of giving a more accurate calculation of a median value without increasing the size of the vector.

To determine the overall range of the descriptive vector of this type, a full pass of the source vector can be made, an O(n) operation.

This descriptive vector may give perfectly accurate results depending on the source vector data values. For example, if the source vector contained all is and the descriptive vector counted the number of 0s, 1s and 2s and a median was computed, an answer of 1 could be computed perfectly utilizing only the descriptive vector if it covered the requested range.

Utilizing this type of descriptive vector, either a proximate or exact solution can be computed for a given source vector, depending on the size of the descriptive vector and source data values. In the normal case, the computation of a proximate or exact solution using this type of descriptive vector is O(log n).

Figure 5A:
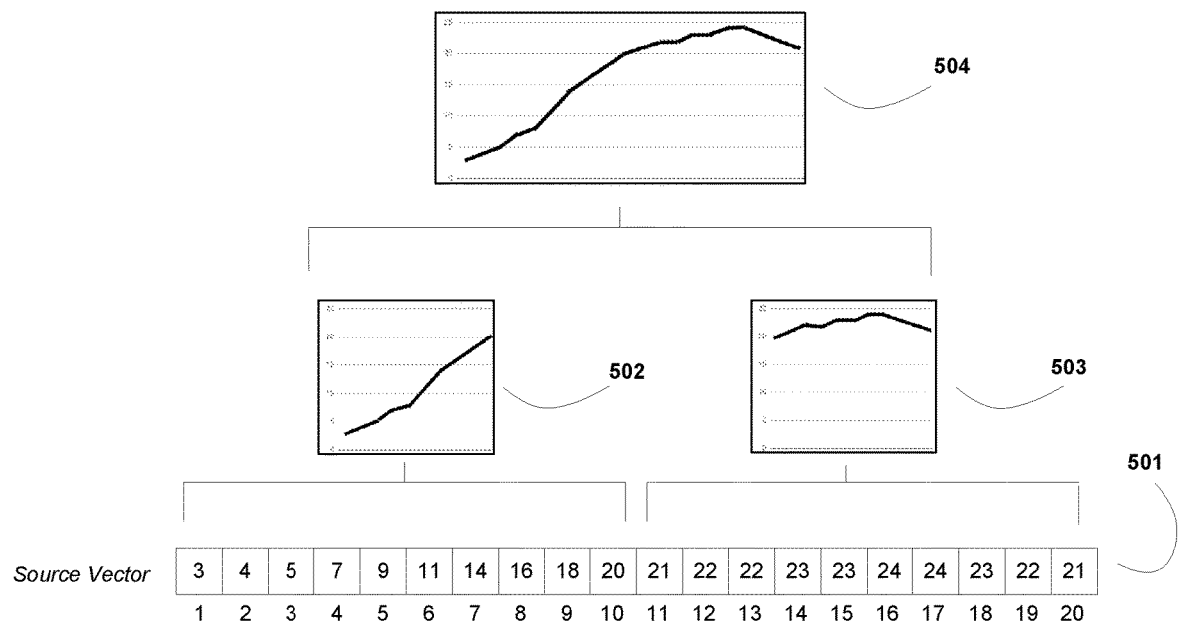
FIG. 5A illustrates the structure of a source vector in tree format, according to an embodiment of the invention.
Figure 5B:
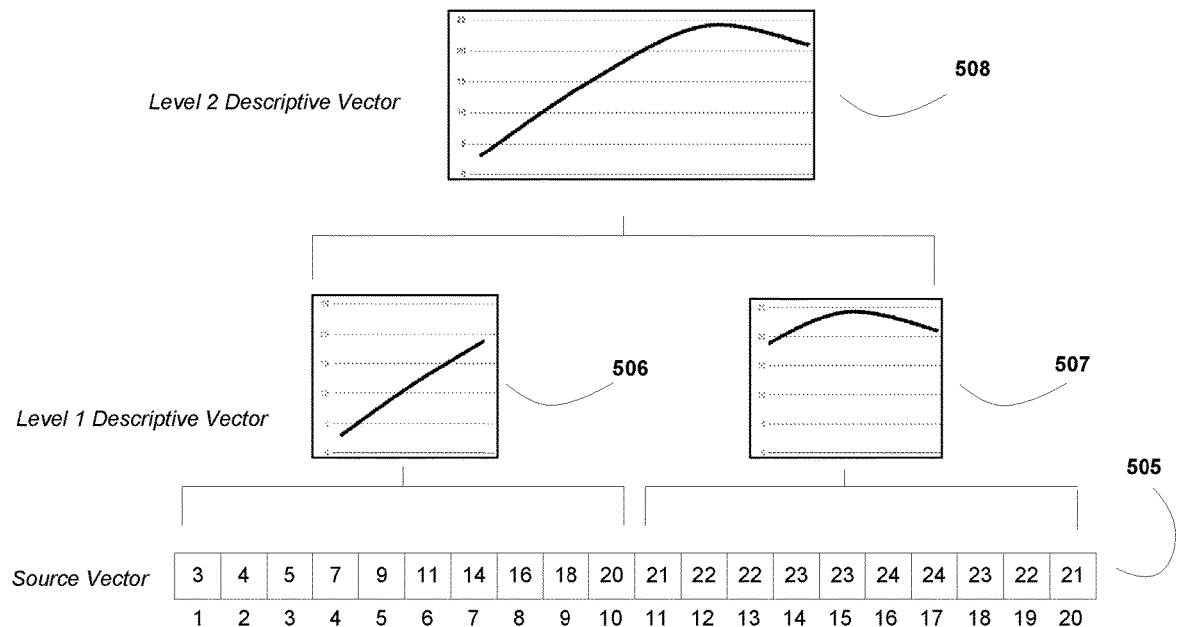
FIG. 5B illustrates the structure of an additional type of descriptive vector tree, according to an embodiment of the invention.

Another type of descriptive vector is shown in FIG. 5B. FIG. 5A shows a raw line graph directly drawn from source vector data 501. FIG. 5B shows descriptive vectors representing the curve approximations of the source data line graphs in FIG. 5A.

The descriptive vectors presented in FIG. 5B are the graphical representation of the actual numerical values in the vector.

The actual numerical values in the vector are the data points that create the respective curves. In the case the curve type is a spline such as a quadratic Bezier curve, the descriptive vector would contain 6 values, the 2 end points (2 values per point) and the control point for the curve. In the case the curve type was a cubic Bezier, the descriptive vector would contain 8 values, the 2 end points and 2 control points of the curve.

Standard curve fitting algorithms can be used to find the curve approximation for the source vector values. Multiple curve types can be supported. For example, to support exact conics, rational Bezier curves can be stored utilizing homogeneous coordinates.

Multiple low-level descriptive vectors can be combined to create higher lever vectors that describe curves over large ranges of data. FIG. 5B shows a curve approximation descriptive vector 506 that describes the source vector 505 range elements 1 through 10. This curve is an approximation of the raw data shown by line graph 502. Similarly, vector 507 is the approximation for the raw graph 503 and describes a curve approximation of elements 11 through 20 in the source vector. Descriptive vectors 506 and 507 are combined to create descriptive vector 508 in FIG. 5B, which approximates the total area line graph 504 in FIG. 5A.

Descriptive vector curves can have a cyclic nature and can contain a value that represents the number of curve cycles. A descriptive vector associated with a SIN curve may have an amplitude, frequency, number of cycles and growth factor as elements in the vector. If 10 source vector data elements could be approximately represented by a half a SIN wave of height 1; the descriptive curve type can be SIN with an amplitude of 1, frequency of 20, number of cycles ½ and growth factor of 1. A growth factor of 2 would represent a cyclic curve doubling in height each subsequent cycle. A frequency growth factor can be present to allow for approximation curves that grow or decrease in frequency over a range. Growth factors can have a type associated with them; linear, logarithmic or exponential.

The simplest type of curve approximation descriptive vector is a linear curve. It can be described by a start value, slope, standard deviation and standard error. All curve estimation descriptive vectors can contain standard deviation and standard error values.

Curve approximation descriptive vectors may or may not perfectly represent their underlying data. If all values in a range are equal, a linear curve descriptive vector can perfectly represent the range. If the values are slightly non-linear, a linear curve estimate descriptive vector would represent an approximation of the underlying data.

Curve approximation descriptive vectors can be used to predict future values. As an example, with the level 2 description 508 in FIG. 5B, an estimate of the next future value would be 20 or 21 since the first derivative at the end of the curve is pointing slightly down. Future value estimations come with an associated confidence interval.

Descriptive vectors can vary in size by level. In the case of a curve approximation vector, higher level descriptors can be a large size than lower level. All descriptive vectors at a given level are the same size and the combination of all descriptive vectors for a given level forms a matrix.

Curve approximation descriptive vectors can also be used to determine events. The system may be configured to generate a data event if a new value falls outside of a predicted value. The simplest case is where data values should follow a linear curve. If a new data point falls outside the range of the linear curve, a data event can be generated to notify another system of the event.

Figure 6:
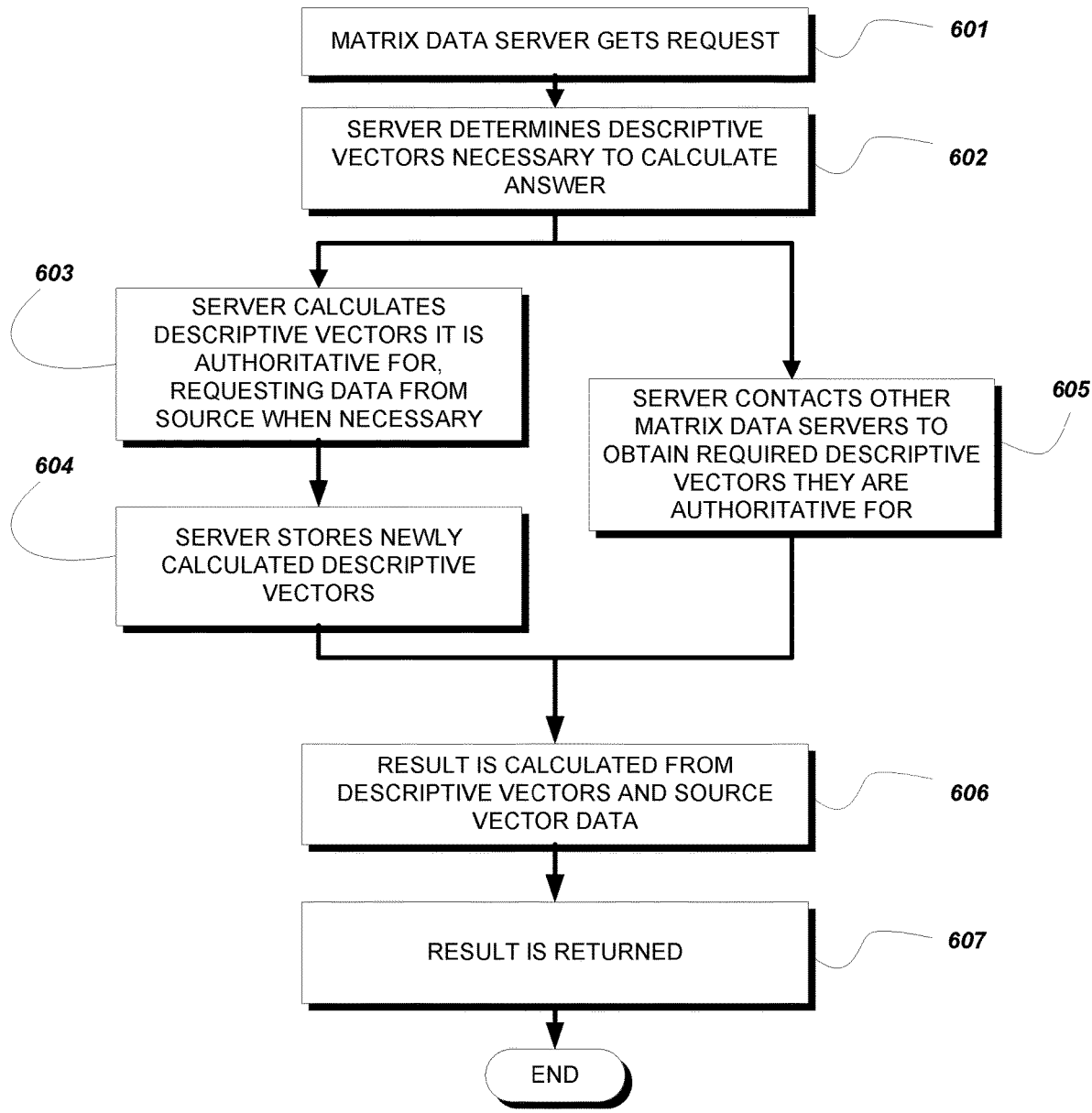
FIG. 6 illustrates a flowchart of an example process for responding to a request, according to an embodiment of the invention.

FIG. 6 shows the process an individual matrix data server uses to respond to a request. After a matrix data server receives a request 601, it determines the descriptive vectors needed to respond to the request 602. A response may also require data from source vectors for data that falls outside the range of existing descriptive vectors.

If the server requires descriptive vectors that it is not authoritative for, it can contact other servers 605 to obtain those descriptive vectors. Any descriptive vectors the server is authoritative for, but which have not been calculated, are calculated 603 with source data requested as necessary. As the server calculates new descriptive vectors from source data, they are stored 604.

After obtaining the full list of required descriptive vectors, including calculating them or obtaining them from other servers if needed, a result is calculated using the set of descriptive vectors and any source vector data that falls outside of the descriptive vector range 606. The result is returned to the requester 607 in the format requested.

The result returned by the data server may be numerical data or a graphical representation of the computed values. The graphical representation of the data can be a chart image or the data points to plot a chart/graph of the requested type.

Chart types include area charts, min/max charts, polar charts, range, bar, and scatter to name a few.

Figure 7:
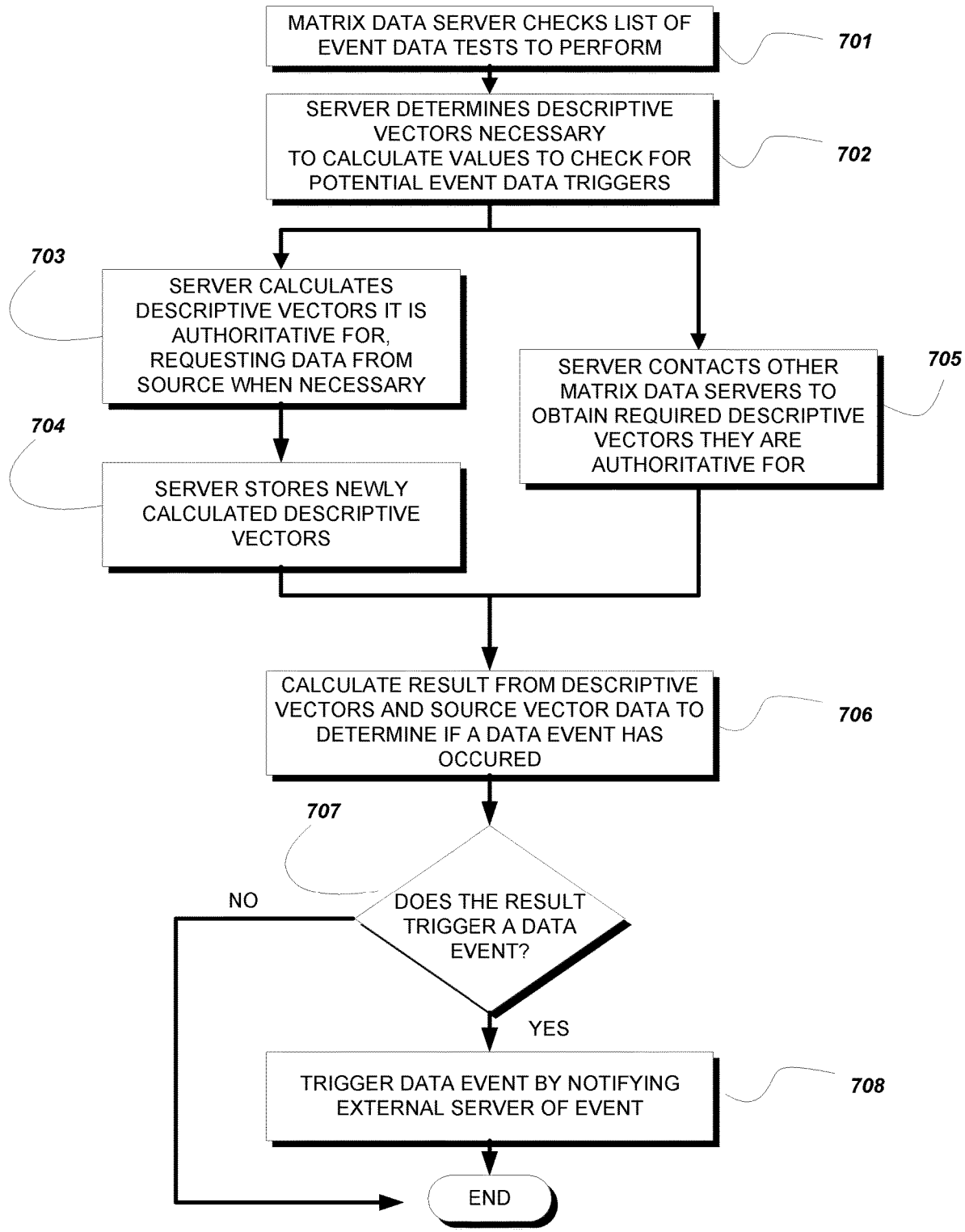
FIG. 7 illustrates a flowchart of an example process for processing a data event, according to an embodiment of the invention.

FIG. 7 shows the process an individual matrix data server uses to check and trigger data events. The matrix data server can check a list of data tests to perform 701 at a configurable regular interval or it can check when asked to check for data events or it can check as data is received if the matrix data server is sent source vector data to process. To check for the triggering of a data event, the server determines the set of descriptive vectors necessary 702 to calculate the value associated with the event.

As is the case when responding to a request, if the server requires descriptive vectors that it is not authoritative for, it can contact other servers 705 to obtain those descriptive vectors. Any descriptive vectors the server is authoritative for, but which have not been calculated, are calculated 703 with source data requested as necessary and as the server calculates new descriptive vectors from source data, they are stored 704.

After obtaining the required descriptive vectors and source vector data, the event value to check is computed 706 to determine if a data event has occurred 707.

If a data event has occurred, the matrix data server notifies the external server of the event as per the configuration of the data event 708.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0 Implementation Mechanisms—Hardware Overview

Figure 8:
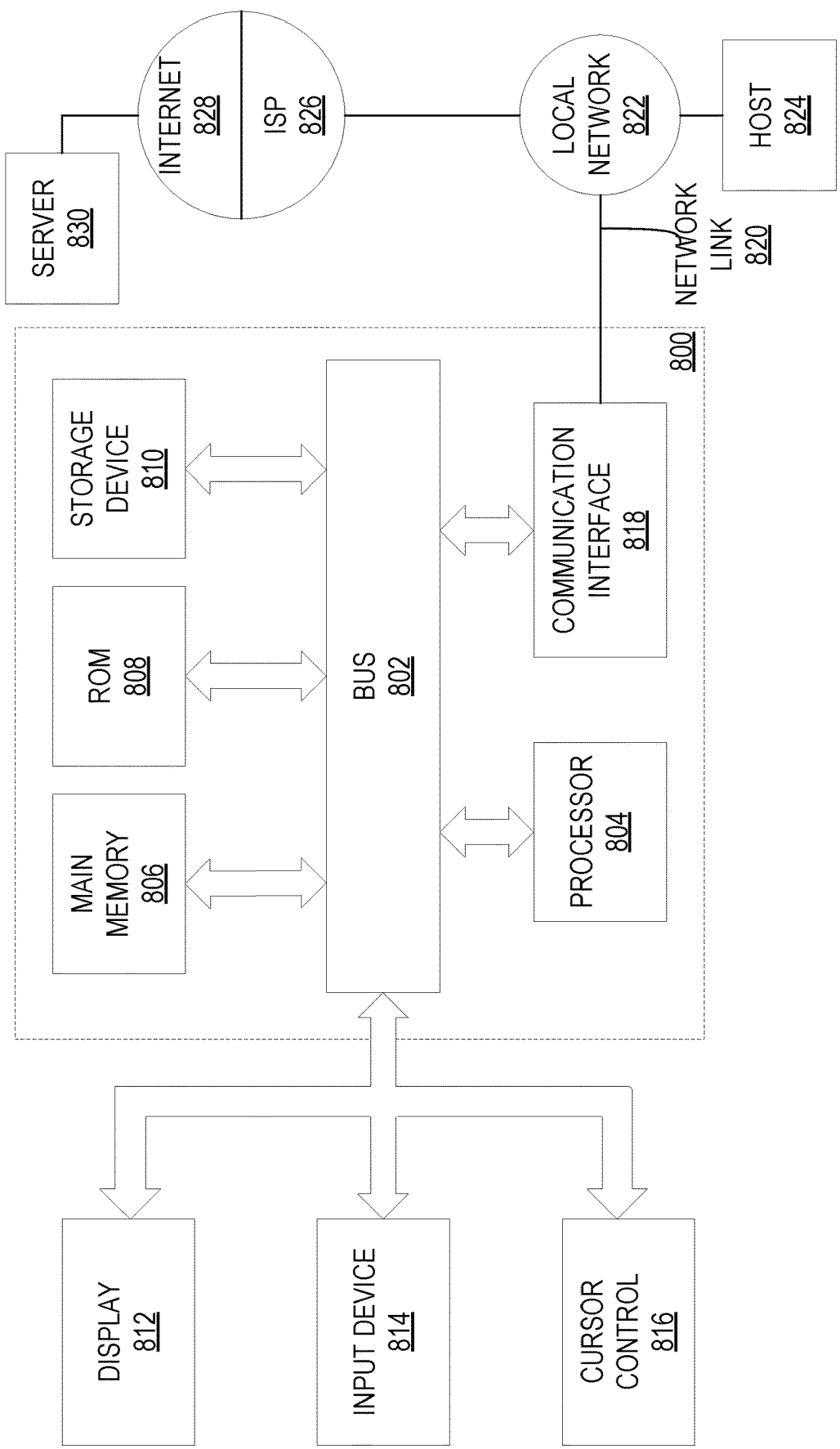
FIG. 8 illustrates an example hardware platform on which a computer or a computing device as described herein may be implemented.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is device-specific to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using device-specific hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

4.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A matrix data system, comprising:
   a set of matrix servers, each matrix server in the set of matrix servers is configured to calculate and store one or more descriptive vectors associated with one or more numerical source data sets, the one or more descriptive vectors calculated from mathematical functions across different ranges of the associated one or more numerical source data sets, each matrix server stores the one or more descriptive vectors in a hierarchy that covers different ranges of the associated numerical data sets;
   wherein upon a particular matrix server, in the set of matrix servers, receiving a request from a client device for calculating a function result on a range of values in a numerical source data set, the particular matrix server utilizing the stored one or more descriptive vectors to calculate a function result and returning the function result to the client device.

2. The system of claim 1, wherein a descriptive vector represents at least a portion of a mathematical function.

3. The system of claim 1, wherein each matrix server in the set of matrix servers is authoritative for one or more ranges of the one or more numerical source data sets.

4. The system of claim 1, wherein descriptive vectors associated with disjoint ranges of the numerical source data are cached across a set of matrix servers.

5. The system of claim 1, wherein numerical source data is requested as needed by matrix servers to calculate descriptive vectors.

6. The system of claim 1, wherein the function result is proximate and not exact.

7. The system of claim 6, wherein a margin of error or standard error is returned with the proximate function result.

8. The system of claim 7, wherein the proximate function result is calculated based on a subset sampling of data from the numerical source data set.

9. The system of claim 1, wherein the function result is returned in JSON format.

10. The system of claim 1, wherein the function result is returned in graphical form.

11. A method, comprising:
    calculating one or more descriptive vectors associated with one or more numerical source data sets at each matrix server in a set of matrix servers, the one or more descriptive vectors calculated from mathematical functions across different ranges of the associated one or more numerical source data sets;
    storing at each matrix server, the one or more descriptive vectors in a hierarchy that covers different ranges of the associated numerical data sets;
    in response to a particular matrix server, in the set of matrix servers, receiving a request from a client device for calculating a function result on a range of values in a numerical source data set:
       calculating, at the particular matrix server, a function result utilizing the stored one or more descriptive vectors; and
       returning the function result to the client device.

12. The method of claim 11, wherein a descriptive vector represents at least a portion of a mathematical function.

13. The method of claim 11, wherein each matrix server in the set of matrix servers is authoritative for one or more ranges of the one or more numerical source data sets.

14. The method of claim 11, wherein descriptive vectors associated with disjoint ranges of the numerical source data are cached across a set of matrix servers.

15. The method of claim 11, wherein numerical source data is requested as needed by matrix servers to calculate descriptive vectors.

16. The method of claim 11, wherein the function result is proximate and not exact.

17. The method of claim 16, wherein a margin of error or standard error is returned with the proximate function result.

18. The method of claim 17, wherein the proximate function result is calculated based on a subset sampling of data from the numerical source data set.

19. The method of claim 11, wherein the function result is returned in JSON format.

20. The method of claim 11, wherein the function result is returned in graphical form.

* * * * *